(12) United States Patent
Culler et al.

(10) Patent No.: US 8,123,828 B2
(45) Date of Patent: *Feb. 28, 2012

(54) METHOD OF MAKING ABRASIVE SHARDS, SHAPED ABRASIVE PARTICLES WITH AN OPENING, OR DISH-SHAPED ABRASIVE PARTICLES

(75) Inventors: Scott R. Culler, Burnsville, MN (US); Dwight D. Erickson, Oakdale, MN (US); Negus B. Adefris, Woodbury, MN (US); John T. Boden, White Bear Lake, MN (US); John D. Haas, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 139 days.

This patent is subject to a terminal disclaimer.

(21) Appl. No.: 12/337,001

(22) Filed: Dec. 17, 2008

(65) Prior Publication Data

US 2009/0165394 A1    Jul. 2, 2009

Related U.S. Application Data

(60) Provisional application No. 61/016,965, filed on Dec. 27, 2007.

(51) Int. Cl.
*B24B 1/00* (2006.01)
*B24D 3/00* (2006.01)
(52) U.S. Cl. .......................... 51/296; 51/309
(58) Field of Classification Search .............. None
See application file for complete search history.

(56) References Cited

U.S. PATENT DOCUMENTS

| | | | |
|---|---|---|---|
| 1,910,444 | A | 5/1933 | Nicholson |
| 3,041,156 | A | 6/1962 | Rowse et al. |
| 3,079,243 | A | 2/1963 | Ueltz |
| 3,387,957 | A | 6/1968 | Howard |
| 3,536,005 | A | 10/1970 | Derrickson |
| 3,874,856 | A | 4/1975 | Leeds |
| 3,909,991 | A | 10/1975 | Coes, Jr. |
| 4,150,078 | A | 4/1979 | Miller et al. |
| 4,314,827 | A | 2/1982 | Leitheiser et al. |

(Continued)

FOREIGN PATENT DOCUMENTS

CA    743 715    10/1966

(Continued)

OTHER PUBLICATIONS

U.S. Appl. No. 61/016,965 entitled "Shaped, Fractured Abrasive Particle, Abrasive Article Using Same and Method of Making", filed Dec. 27, 2007.

(Continued)

*Primary Examiner* — Jerry Lorengo
*Assistant Examiner* — Ross J Christie
(74) *Attorney, Agent, or Firm* — Scott A. Baum (57) ABSTRACT

By controlling the process parameters and by using a polymeric production tooling having a plurality of mold cavities, different types of shaped abrasive particles selected from the group consisting of abrasive shards, dish-shaped abrasive particles, and shaped abrasive particles with an opening can be produced from the exact same mold. In one embodiment, the mold comprised a plurality of equilateral triangles and fractured precursor abrasive particles, dish-shaped precursor abrasive particles, or precursor shaped abrasive particles with an opening were produced from the same mold.

33 Claims, 5 Drawing Sheets

U.S. PATENT DOCUMENTS

| | | | |
|---|---|---|---|
| 4,341,663 A | 7/1982 | Derleth et al. | |
| 4,393,021 A | 7/1983 | Eisenberg et al. | |
| 4,548,617 A | 10/1985 | Miyatani et al. | |
| 4,744,802 A | 5/1988 | Schwabel | |
| 4,799,939 A | 1/1989 | Bloecher et al. | |
| 4,848,041 A | 7/1989 | Kruschke | |
| 4,954,462 A | 9/1990 | Wood | |
| 4,963,012 A * | 10/1990 | Tracy et al. | 359/514 |
| 4,997,461 A | 3/1991 | Markhoff-Matheny et al. | |
| 5,009,675 A | 4/1991 | Kunz et al. | |
| 5,009,676 A | 4/1991 | Rue et al. | |
| 5,011,508 A | 4/1991 | Wald et al. | |
| 5,035,723 A | 7/1991 | Kalinowski | |
| 5,042,991 A | 8/1991 | Kunz et al. | |
| 5,049,645 A | 9/1991 | Nagaoka et al. | |
| 5,078,753 A | 1/1992 | Broberg et al. | |
| 5,085,671 A | 2/1992 | Martin et al. | |
| 5,090,968 A | 2/1992 | Pellow | |
| 5,120,327 A | 6/1992 | Dennis | |
| 5,152,917 A | 10/1992 | Pieper et al. | |
| 5,185,299 A | 2/1993 | Wood et al. | |
| 5,201,916 A | 4/1993 | Berg et al. | |
| 5,213,591 A | 5/1993 | Celikkaya et al. | |
| 5,282,875 A * | 2/1994 | Wood et al. | 51/298 |
| 5,304,331 A * | 4/1994 | Leonard et al. | 425/308 |
| 5,312,789 A | 5/1994 | Wood | |
| 5,312,791 A | 5/1994 | Coblenz et al. | |
| 5,366,523 A | 11/1994 | Rowenhorst et al. | |
| 5,409,645 A | 4/1995 | Torre, Jr. et al. | |
| 5,431,967 A | 7/1995 | Manthiram | |
| 5,435,816 A | 7/1995 | Spurgeon et al. | |
| 5,441,549 A | 8/1995 | Helmin | |
| 5,443,603 A | 8/1995 | Kirkendall | |
| 5,454,844 A | 10/1995 | Hibbard et al. | |
| 5,496,386 A | 3/1996 | Broberg et al. | |
| 5,516,348 A | 5/1996 | Conwell et al. | |
| 5,551,963 A | 9/1996 | Larmie | |
| 5,576,409 A * | 11/1996 | Mackey | 524/714 |
| RE35,570 E | 7/1997 | Rowenhorst et al. | |
| 5,645,619 A | 7/1997 | Erickson | |
| 5,667,542 A | 9/1997 | Law et al. | |
| 5,672,097 A | 9/1997 | Hoopman | |
| 5,725,162 A | 3/1998 | Garg | |
| 5,776,214 A * | 7/1998 | Wood | 51/309 |
| 5,779,743 A * | 7/1998 | Wood | 51/309 |
| 5,893,935 A * | 4/1999 | Wood | 51/309 |
| 5,902,647 A * | 5/1999 | Venkataramani et al. | 427/454 |
| 5,908,477 A | 6/1999 | Harmer et al. | |
| 5,908,478 A * | 6/1999 | Wood | 51/309 |
| 5,946,991 A | 9/1999 | Hoopman | |
| 5,975,987 A | 11/1999 | Hoopman et al. | |
| 5,984,988 A | 11/1999 | Berg et al. | |
| 6,019,805 A | 2/2000 | Herron | |
| 6,053,956 A * | 4/2000 | Wood | 51/309 |
| 6,054,093 A | 4/2000 | Torre, Jr. et al. | |
| 6,080,215 A * | 6/2000 | Stubbs et al. | 51/295 |
| 6,080,216 A * | 6/2000 | Erickson | 51/309 |
| 6,129,540 A | 10/2000 | Hoopman et al. | |
| 6,206,942 B1 * | 3/2001 | Wood | 51/309 |
| 6,228,134 B1 * | 5/2001 | Erickson | 51/309 |
| 6,261,682 B1 | 7/2001 | Law | |
| 6,264,710 B1 * | 7/2001 | Erickson | 51/309 |
| 6,277,160 B1 * | 8/2001 | Stubbs et al. | 51/295 |
| 6,277,161 B1 | 8/2001 | Castro | |
| 6,287,353 B1 | 9/2001 | Celikkaya | |
| 6,312,324 B1 | 11/2001 | Mitsui et al. | |
| 6,319,108 B1 | 11/2001 | Adefris | |
| 6,475,253 B2 * | 11/2002 | Culler et al. | 51/295 |
| 6,524,681 B1 | 2/2003 | Seitz et al. | |
| 6,696,258 B1 * | 2/2004 | Wei et al. | 435/7.2 |
| 6,843,815 B1 | 1/2005 | Thurber et al. | |
| 6,881,483 B2 | 4/2005 | McArdle | |
| 6,974,930 B2 | 12/2005 | Jense | |
| 7,297,402 B2 | 11/2007 | Evans | |
| 7,373,887 B2 * | 5/2008 | Jackson | 102/517 |
| 2001/0027623 A1 | 10/2001 | Rosenflanz | |
| 2002/0026752 A1 | 3/2002 | Culler et al. | |
| 2002/0151265 A1 | 10/2002 | Adefris | |
| 2003/0085204 A1 | 5/2003 | Lagos | |
| 2003/0110707 A1 | 6/2003 | Rosenflanz et al. | |
| 2003/0126800 A1 | 7/2003 | Seth et al. | |
| 2004/0003895 A1 | 1/2004 | Amano et al. | |
| 2004/0148967 A1 | 8/2004 | Celikkaya et al. | |
| 2004/0235406 A1 * | 11/2004 | Duescher | 451/527 |
| 2004/0244675 A1 | 12/2004 | Kishimoto | |
| 2005/0020190 A1 | 1/2005 | Schutz et al. | |
| 2005/0060941 A1 | 3/2005 | Provow | |
| 2005/0060947 A1 | 3/2005 | McArdle | |
| 2005/0064805 A1 | 3/2005 | Culler et al. | |
| 2005/0132655 A1 | 6/2005 | Anderson et al. | |
| 2005/0232853 A1 | 10/2005 | Evans | |
| 2005/0284029 A1 | 12/2005 | Bourlier | |
| 2006/0185256 A1 | 8/2006 | Nevoret et al. | |
| 2007/0020457 A1 | 1/2007 | Adefris | |
| 2007/0072527 A1 | 3/2007 | Palmgren | |
| 2008/0172951 A1 | 7/2008 | Starling | |
| 2009/0016916 A1 | 1/2009 | Rosenzweig et al. | |
| 2010/0003904 A1 | 1/2010 | Duescher | |

FOREIGN PATENT DOCUMENTS

| | | |
|---|---|---|
| EP | 0 293 163 | 11/1988 |
| EP | 0 662 110 | 7/1995 |
| GB | 986847 | 3/1965 |
| JP | 60-006356 | 1/1985 |
| JP | 2002-038131 | 2/2002 |
| JP | 2003-049158 | 2/2003 |
| JP | 2004-510873 | 4/2004 |
| JP | 2006-192540 | 7/2006 |
| WO | WO95/18192 | 7/1995 |
| WO | WO99/38817 | 8/1999 |
| WO | WO01/14494 | 3/2001 |

OTHER PUBLICATIONS

U.S. Appl. No. 12/336,877 "Shaped, Fractured Abrasive Particle, Abrasive Article Using Same and Method of Making", filed Dec. 17, 2008.
U.S. Appl. No. 12/336,961 entitled "Dish-Shaped Abrasive Particles With a Recessed Surface", filed Dec. 17, 2008.
U.S. Appl. No. 12/337,112 entitled "Shaped Abrasive Particles With an Opening", filed Dec. 17, 2008.
U.S. Appl. No. 61/138,268 entitled "Shaped Abrasive Particles With Grooves", filed Dec. 17, 2008.
U.S. Appl. No. 12/337,075 entitled "Shaped Abrasive Particles With a Sloping Sidewall" filed Dec. 17, 2008.
U.S. Appl. No. 12/570,067 entitled "Shaped Abrasive Particles With Low Roundness Factor" filed Sep. 30, 2009.
Office Action dated Feb. 18, 2011 in U.S. Appl. No. 12/336,877.
Office Action dated Mar. 21, 2011 in U.S. Appl. No. 12/627,567.
Office Action dated Mar. 24, 2011 in U.S. Appl. No. 12/336,961.
Office Action dated Mar. 30, 2011 in U.S. Appl. No. 12/337,112.
Office Action dated Apr. 1, 2011 in U.S. Appl. No. 12/337,075.
U.S. Appl. No. 12/827,274 entitled "Transfer Assisted Screen Printing Method of Making Shaped Abrasive Particles and the Resulting Shaped Abrasive Particles", filed Jun. 30, 2010.
www.abrasivematerials.saint-gobain,com News—Shaped Abrasive Particles Article, Dated Apr. 25, 2011 and retrieved on May 23, 2011.
"Investigation of Shaped Abrasive Particles vol. 1: Review of US Pat. No. 6,054,093 Apr. 25, 2000" © Apr. 2011.
Office Action dated Jun. 3, 2011 in U.S. Appl. No. 12/336,961.
Final Office Action dated Oct. 18, 2011 in U.S. Appl. No. 12/336,961.

* cited by examiner

METHOD OF MAKING ABRASIVE SHARDS, SHAPED ABRASIVE PARTICLES WITH AN OPENING, OR DISH-SHAPED ABRASIVE PARTICLES

This application claims the benefit of U.S. provisional application Ser. No. 61/016,965 entitled "Shaped, Fractured Abrasive Particle, Abrasive Article Using Same and Method Of Making", filed on Dec. 27, 2007 and herein incorporated by reference in its entirety.

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

Triangular shaped abrasive particles and abrasive articles using the triangular shaped abrasive particles are disclosed in U.S. Pat. No. 5,201,916 to Berg; U.S. Pat. No. 5,366,523 to Rowenhorst; and U.S. Pat. No. 5,984,988 to Berg. In one embodiment, the abrasive particles' shape comprised an equilateral triangle. Triangular shaped abrasive particles are useful in manufacturing abrasive articles having enhanced cut rates.

SUMMARY

Shaped abrasive particles, in general, can have superior performance over randomly crushed abrasive particles. By controlling the shape of the abrasive particle it is possible to control the resulting performance of the abrasive article. Different abrading applications can require different types of shaped abrasive particles. Therefore, having a process that can produce several different types of the shaped abrasive particles from the same process line is highly desirable.

The inventors have determined that by controlling the process parameters and by using a polymeric production tooling having a plurality of mold cavities, different types of the shaped abrasive particles can be produced from the exact same mold. In particular, the inventors have determined a method to fracture the shaped abrasive particles while still in the mold to produce abrasive shards instead of solid, intact shaped abrasive particles. The inventors have also determined a method of controlling the formation of the shaped abrasive particles while residing in the mold in order to form an opening through the shaped abrasive particle. Lastly, the inventors have also determined a method of controlling the formation of the shaped abrasive particle while residing in the mold to form a concave surface on the shaped abrasive particle to make a dish-shaped abrasive particle. Thus, depending on the process parameters, the same identical production tooling having a plurality of mold cavities can produce solid, intact shaped abrasive particles, abrasive shards, shaped abrasive particles with an opening, or dish-shaped abrasive particles.

Hence, in one embodiment, the invention resides in a method comprising: providing a mold having a plurality of cavities, the plurality of cavities comprising polymeric surfaces; filling the plurality of cavities with a sol-gel, the sol-gel comprising particles that can be converted into alpha alumina in a liquid, the liquid comprising a volatile component; removing at least a portion of the volatile component from the sol-gel while the sol-gel resides in the plurality of cavities thereby forming a plurality of precursor shaped abrasive particles having a type selected from the group consisting of abrasive shards, shaped abrasive particles with an opening, and dish-shaped abrasive particles.

BRIEF DESCRIPTION OF THE DRAWING

It is to be understood by one of ordinary skill in the art that the present discussion is a description of exemplary embodiments only, and is not intended as limiting the broader aspects of the present disclosure, which broader aspects are embodied in the exemplary construction.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein, the term "abrasive dispersion" means an alpha alumina precursor that can be converted into alpha alumina that is introduced into a mold cavity. The composition is referred to as an abrasive dispersion until sufficient volatile components are removed to bring solidification of the abrasive dispersion.

As used herein, the term "precursor shaped abrasive particle" means the unsintered particle produced by removing a sufficient amount of the volatile component from the abrasive dispersion, when it is in the mold cavity, to form a solidified body that can be removed from the mold cavity and substantially retain its molded shape in subsequent processing operations.

As used herein, the term "precisely formed surface" means a surface that is created by at least partially drying, dewatering, or curing an abrasive dispersion while residing in a cavity in a mold.

As used herein, the term "abrasive shard" means the sintered alpha alumina abrasive particle produced by the process of this disclosure.

As used herein, the term "shaped abrasive particle", means a ceramic abrasive particle with at least a portion of the abrasive particle having a predetermined shape that is replicated from a mold cavity used to form the shaped precursor abrasive particle. Except in the case of abrasive shards (e.g. as described in U.S. provisional application 61/016,965), the shaped abrasive particle will generally have a predetermined geometric shape that substantially replicates the mold cavity that was used to form the shaped abrasive particle. Shaped abrasive particle as used herein excludes abrasive particles obtained by a mechanical crushing operation.

DETAILED DESCRIPTION

Prior to describing the process used to make the different types of shaped abrasive particles, the various types will be described in more detail.

Abrasive Shards

Figure 3:
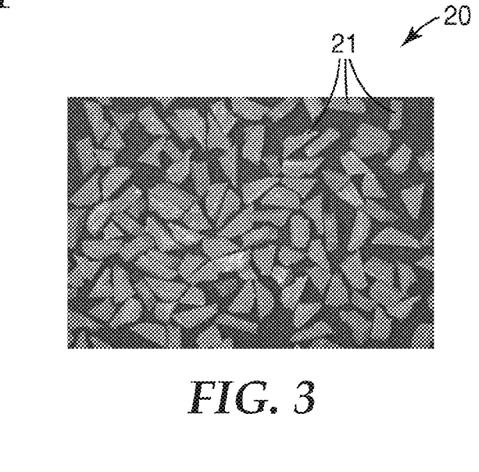
FIG. 3 is a photograph of the fractured abrasive shards resulting from the right-hand side of the mold in FIG. 1.
Figure 4:
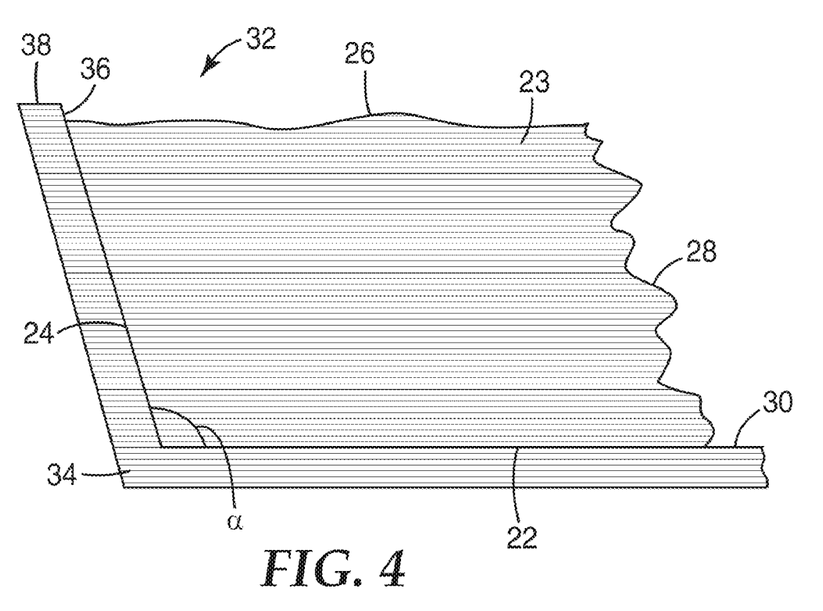
FIG. 4 illustrates a cross section of one embodiment of a precursor shaped abrasive particle in a mold cavity.
Figure 5:
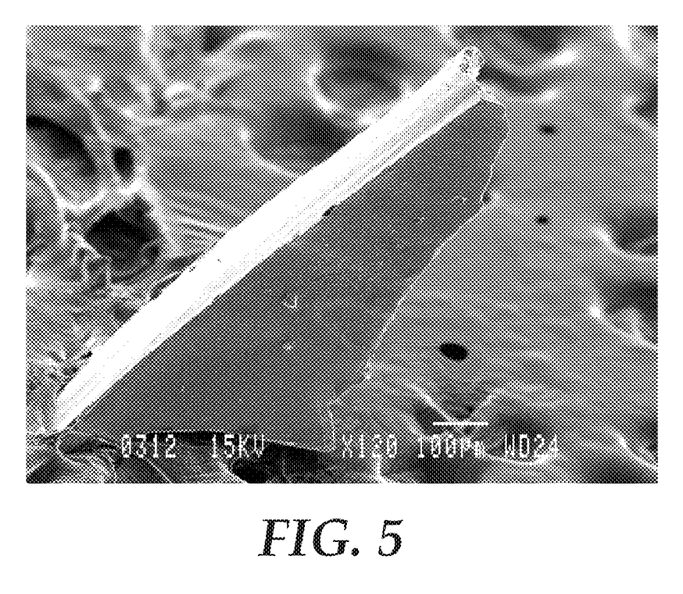
FIG. 5 is a photomicrograph from a scanning electron microscopic of a representative abrasive shard similar to the abrasive shards shown in FIG. 3.

Referring to FIGS. 3 and 5 abrasive particles 20 are illustrated. The abrasive particles 20 comprise fractured alpha alumina abrasive particles formed into a plurality of alpha alumina abrasive shards 21. Referring to FIG. 4, a precursor shaped abrasive particle 23 in a mold 34 is illustrated. Each of the alpha alumina abrasive shards 21 comprises at least a first precisely formed surface 22, a second precisely formed surface 24 intersecting with the first precisely formed surface at a predetermined angle α, a third surface 26 opposite the first precisely formed surface 22, and a fractured surface 28. The first precisely formed surface 22 can be formed by contact with a bottom surface 30 of a cavity 32 in the mold 34. In FIG. 4, only a portion of the cavity 32 in the mold 34 is indicated in cross section. Typically, the mold 34 has a plurality of cavities to economically produce the alpha alumina abrasive shards 21. The first precisely formed surface 22 substantially replicates the surface finish and shape of the bottom surface 30 of the cavity 32.

The second precisely formed surface 24 of the abrasive shard 21 can be formed by contact with a sidewall 36 of the cavity 32 in the mold 34. The sidewall 36 is designed to intersect the bottom surface 30 at a predetermined angle α. The second precisely formed surface 24 substantially replicates the surface finish and shape of the sidewall 36 of the cavity 32. The second precisely formed surface 24 is molded by contact with the sidewall 36 of the cavity 32. As such, at least two surfaces of the resulting abrasive shard are precisely formed (22, 24) and the angle of intersection a between the two surfaces is a pre-determined angle based on the selected mold geometry.

The third surface 26 of the abrasive shard 21 opposite the first precisely formed surface 22 can be randomly wavy or undulating in appearance since it is in contact with the air after the cavity 32 is filled with an abrasive dispersion. The third surface 26 is not precisely formed since it is not molded by contact with the cavity 32. Often, the third surface 26 is created by scraping or doctoring a top surface 38 of the mold 34 to remove excessive abrasive dispersion from the mold. The doctoring or scraping step can result in a subtle waviness or irregularity of the third surface 26 that is visible under magnification. As such, the third surface 26 is similar to a surface created by extrusion, which is also not precisely formed. In the extrusion process, the sol-gel is forced out of a die. As such, the surfaces of the sol-gel exhibits scrape marks, gouges, and/or score lines as a result of the extrusion process. Such marks are created by the relative motion between the sol-gel and the die. Additionally, extruded surfaces from a die can be generally a smooth plane. In contrast, the precisely formed surfaces can replicate a sinusoidal or other more complex geometrical surface having significant variations in height along the length of the surface.

The fractured surface 28 of the abrasive shard 21 generally propagates between the first precisely formed surface 22 and the opposing third surface 26 and between opposing sidewalls of the cavity 32 when the cavity depth is relatively small compared to the area of the bottom surface 30. The fractured surface 28 is characterized by sharp, jagged points typical of a brittle fracture. The fractured surface 28 can be created by a drying process that cracks or fractures at least the majority of the precursor shaped abrasive particles into at least two pieces while residing in the cavity 32. This produces abrasive shards 21 having a smaller size than the mold cavity 32 from which they were made. The abrasive shards, once formed, could be reassembled like jigsaw puzzle pieces to reproduce the original cavity shape of the mold from which they were made. The cracking or fracturing of the precursor shaped abrasive particles is believed to occur by ensuring that the surface tension of the abrasive dispersion to the walls of the cavity 32 is greater than the internal attractive forces of the abrasive dispersion as the abrasive dispersion is dried in the cavity.

Referring to FIG. 5, for the abrasive shard 21 illustrated, the fractured surface 28 is present along the right-hand side of the abrasive shard. The second precisely formed surface 24 is present along the left-hand, angled surface of the abrasive shard 21. The third surface 26 is facing frontward and has some irregularity and waviness from the scrapping operation. The first precisely formed surface 22 is hidden from view facing rearward. The abrasive shard in FIG. 5 was produced in a triangular mold cavity. One of the triangle's corners is present at the lower, left portion of the abrasive shard.

Figure 1:
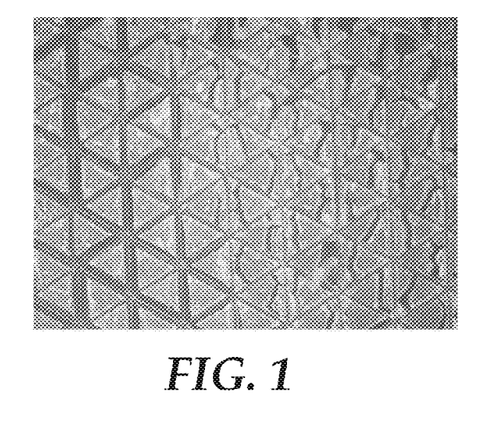
FIG. 1 is a photograph of a top view of a mold having a plurality of cavities containing precursor abrasive particles.
Figure 2:
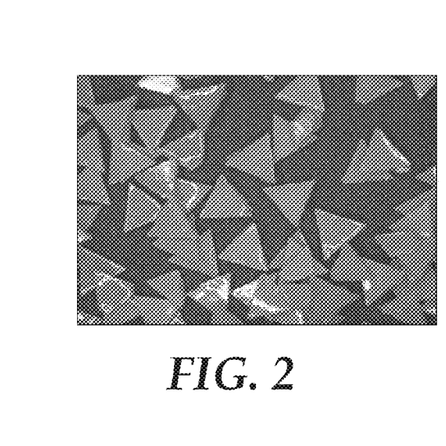
FIG. 2 is a photograph of the dish-shaped abrasive particles resulting from the left-hand side of the mold in FIG. 1.

Referring to FIG. 1, the fracturing process produces a discrete number of fractured, precursor shaped abrasive particles in each mold cavity. In general, about 2 to 4 fractured precursor shaped abrasive particles are produced within each cavity 32. As such, the inventive process produces few extremely small particles (fines) resulting in less waste than if a crushing operation was used to reduce the intact triangular particle size as shown in FIG. 2. Because of the fracturing process, each of the abrasive shards retains a portion of its original molded shape unlike a crushing operation that could produce abrasive particles without any precisely formed surfaces remaining. As such, the size distribution of the fractured, precursor shaped abrasive particles is relatively small and more uniform than crushed particles. The ultimate number of fractured, precursor shaped abrasive particles produced within each cavity can vary depending on the cavity size and shape, the drying rate, and temperature used to fracture the precursor shaped abrasive particles within the mold. In various embodiments of the disclosure, less than or equal to about 10, 9, 8, 7, 6, 5, 4, 3, or 2 fractured, precursor shaped abrasive particles are produced within each mold cavity.

Since the precursor shaped abrasive particles are processed in such a manner as to intentionally fracture them, at least the majority (greater than 50 percent) of the precursor shaped abrasive particles are fractured into at least two pieces within the mold's cavity 32 as the precursor shaped abrasive particles are dried. In various embodiments of the disclosure, about 75 percent to 100 percent, or about 90 to 100 percent, or about 98 to 100 percent of the precursor shaped abrasive particles are fractured into at least two pieces while residing in the cavities in the mold.

Because the precursor shaped abrasive particles are intentionally fractured while residing in the mold, they retain at least a portion of the original molded shape's sidewall and bottom. This feature can provide abrasive shards that are sharper than crushed particles, which can have much more rounded and blocky shapes. The fractured, precursor shaped abrasive particles can have a high aspect ratio and very sharp edges where the fractured surface 28 meets with the precisely formed surfaces. As such, the alpha alumina abrasive shards have excellent performance when used to make an abrasive article.

The fractured, precursor shaped abrasive particles are calcined and sintered to form the alpha alumina abrasive shards. The alpha alumina abrasive shards may be manufactured in a wide range of particle sizes depending on the size of the molded cavity and the number of fractured pieces created by the fracturing step of the process. Typically the alpha alumina abrasive shards range in size from 0.1 to 5000 micrometers, 1 to 2000 micrometers, 5 to 1500 micrometers, or even in some embodiments, from 50 to 1000, or even from 100 to 1000 micrometers.

As described more fully in pending provisional U.S. patent application Ser. No. 61/016,965 entitled "Shaped, Fractured Abrasive Particle, Abrasive Article Using Same and Method of Making", filed on Dec. 27, 2007, the alpha alumina abrasive shards have superior grinding performance when compared to conventional crushed alpha alumina grain having the same nominal abrasive grade, Shaped Abrasive Particles with an Opening Referring to FIGS. 6A, 6B, and 6C an exemplary shaped abrasive particle 120 with an opening 122 is illustrated. The material from which the shaped abrasive particle 120 with an opening 122 is made comprises alpha alumina. In general, the shaped abrasive particles 120 with an opening 122 comprise thin bodies having a first face 124, and a second face 126 separated by a sidewall 128 and having a thickness t. In some embodiments, the sidewall 128 can minimized for particles where the faces taper to a thin edge or point where they meet inside of having a thicker sidewall 128. In one embodiment, the first face 124 is substantially planar, the second face 126 is substantially planar, or both faces are substantially planar. In one embodiment, the first face 124 and the second face 126 are substantially parallel to each other. In other embodiments, the first face 124 and second face 126 can be nonparallel such that one face is sloped with respect to the other face and imaginary lines tangent to each face would intersect at a point. The sidewall 128 of the shaped abrasive particle 120 with an opening 122 can vary and it forms the perimeter 129 of the first face 124 and the second face 126. In one embodiment, the perimeter 129 of the first face 124 and second face 126 is selected to be a geometric shape, and the first face 124 and the second face 126 are selected to have the same geometric shape, although, they may differ in size with one face being larger than the other face. In one embodiment, the perimeter 129 of first face 124 and the perimeter 129 of the second face 126 was a triangular shape that is illustrated.

Figure 6A:
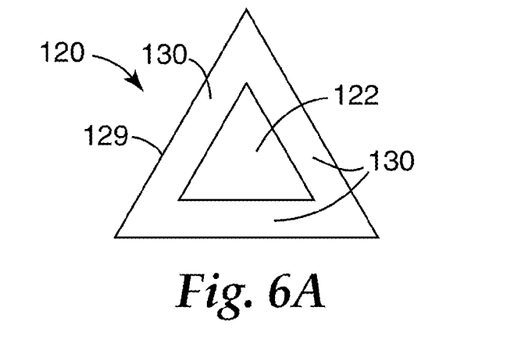
FIGS. 6A-6C illustrates a shaped abrasive particle with an opening.
Figure 6B:
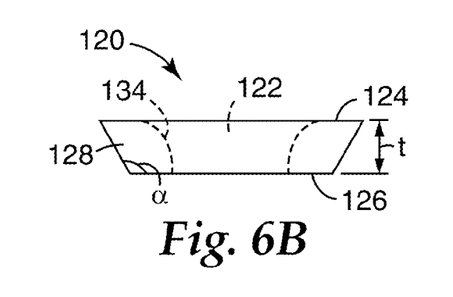
Figure 6C:
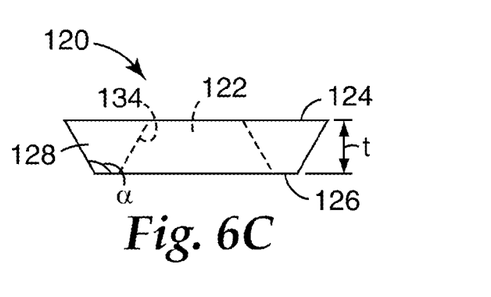
Figure 7:
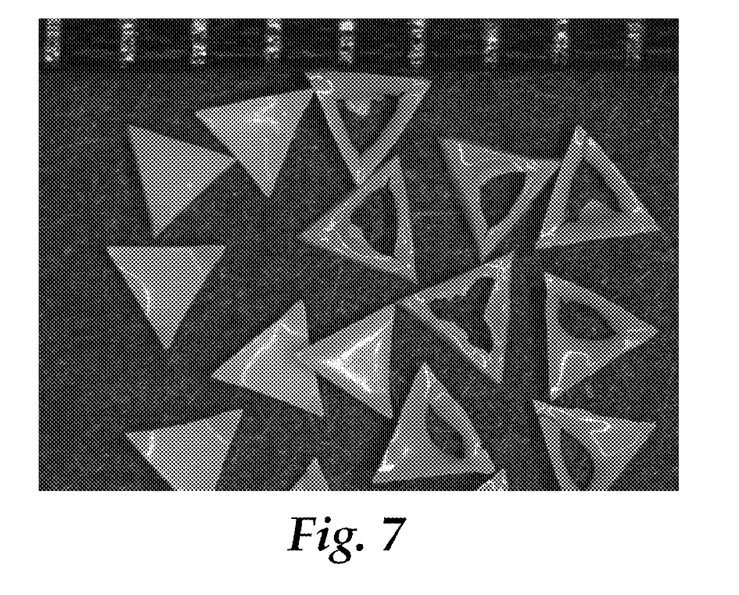
FIG. 7 is a photograph of dish-shaped abrasive particles compared to shaped abrasive particles having an opening.

The opening 122, in one embodiment, passes completely thorough the first face 124 and the second face 126 as best seen in FIGS. 6B, 6C, and 7. In other embodiments, the opening 122 comprises a blind hole which may not pass completely through both faces. In one embodiment, the size of the opening 122 is quite large relative to the area of the first face 124 or the second face 126. As best seen in FIG. 6A, in one embodiment the opening 122 comprised a triangular shape closely approximating the shape of the perimeter 129 of the shaped abrasive particle 120. As such, the shaped abrasive particle 120 with an opening 122 comprised an integral connection of a plurality of bars 130 joined at their respective ends to form a closed polygon. In other embodiments, the opening 122 can be circular, oval, or other geometric shape.

In various embodiments of the invention, an opening ratio of the opening 122 area divided by the face area of the larger of either the first face 124 or the second face 126 can be between about 0.05 to about 0.95, or between about 0.1 to about 0.9, or between about 0.1 to about 0.7, or between about 0.1 to about 0.5. For the purposes of this calculation, the face area is based on the area enclosed by the perimeter 129 without subtracting any area due to the opening 122. As will be described later, it is believed that shaped abrasive particles having a larger opening 122 relative to the face size have enhanced grinding performance.

In various embodiments of the invention, the area or size of the first face 124 and the area or size of the second face 126 are substantially equal. In other embodiments of the invention, the first face 124 or second face 126 can be smaller than the other face. Referring to FIGS. 6B and 6C, draft angle α between the second face 126 and the sidewall 128 of the shaped abrasive particle 120 can be varied to change the relative sizes of each face. In one embodiment of the invention, draft angle α can be approximately 90 degrees such that the area of both faces are substantially equal. In another embodiment of the invention, draft angle α can be greater than 90 degrees such that the area of the first face 124 is greater than the area of the second face 126. In another embodiment of the invention, draft angle α can be less than 90 degrees such that the area of the first face 124 is less than the area of the second face 126. In other embodiments of the invention, the draft angle α can be between about 95 degrees to about 130 degrees, between about 95 degrees to about 125 degrees, or between about 95 degrees to about 115 degrees. Without wishing to be bound by theory, it is believed that a draft angle other than 90 degrees results in the shaped abrasive particles 120 leaning instead of having a 90 degree orientation to the backing in a coated abrasive article since the base of the shaped abrasive particle 120 in the coated abrasive (sidewall 128) is sloped due to the draft angle. Because the shaped abrasive particles 120 are mostly tipped or leaning to one side due to the angled base they rest on, they can have an orientation angle less than 90 degrees relative to the backing thereby enhancing cut rates as described in greater detail in copending patent application entitled "Shaped Abrasive Particles With A Sloping Sidewall", filed on Dec. 17, 2008 and having U.S. Ser. No. 12/337,075. In one embodiment described in this patent application, a 98 degree draft angle α was used which had approximately twice the cut rate of a similarly shaped abrasive particle having a 90 degree draft angle α.

Shaped abrasive particles 120 with an opening 122 can have several unexpected benefits over solid, intact shaped abrasive particles without an opening. First, the shaped abrasive particles 120 with an opening 122 have an enhanced cut rate as compared to solid, shaped abrasive particles. Without wishing to be bound by theory, it is believed that the enhanced cut rate results from a reduction in the size of the wear flat as the abrasive particle is used. As shaped abrasive particles wear, typically a larger and larger wear flat appears on the working surface of the shaped abrasive particle dulling the shaped abrasive particle. In contrast, as the shaped abrasive particles 120 with an opening 122 wear, the size of the wear flat can initially increase until the shaped abrasive particle is worn through to the opening 122. At that point, the presence of the opening 122 effectively reduces the total size of the wear flat by creating two smaller wear flats instead of the single larger wear flat previously present. The newly formed smaller wear flats re-sharpen the shaped abrasive particle 120 enhancing its performance over solid, shaped abrasive particles.

Second, it is believed that the opening 122 in the shaped abrasive particle 120, in some embodiments, can act as a reservoir to hold more grinding aid or supersize compounds than can be placed onto solid, shaped abrasive particles without an opening 122. Furthermore, since the grinding aid is present on the surface and in the middle of the shaped abrasive particle 120 with an opening 122, grinding aid is present both during initial use of the abrasive particle and later as the shaped abrasive particle 120 with an opening 122 is worn through to the grinding aid reservoir located in the opening 122 thereby enhancing cut performance.

Lastly, in some embodiments, it is believed that the opening 122 in the shaped abrasive particles 120 can act as an anchor point to more firmly attach the shaped abrasive particles 120 to a backing by use of a make coat or size coat thereby reducing "shelling" of the shaped abrasive particles 120 during use. When the shaped abrasive particles 120 with an opening 122 are used to form a coated abrasive article, the cured make or size coat can pass completely through the shaped abrasive particle 120. As such, the shaped abrasive particles 120 with an opening 122 are more firmly attached to the coating when compared to solid, shaped abrasive particles which are only attached by adhesion to the sides of the particles. In essence, the shaped abrasive particles 120 with an opening 122 are "stitched" into the make or size coat since the coating can pass though the opening 122 thereby more firmly holding the particle as opposed to solid, shaped abrasive particles being adhered only by their sides.

In various embodiments of the invention in a coated abrasive article, the opening 122 in the shaped abrasive particles 120 with an opening 122 can contain make coating, size coating, supersize coating, grinding aid, empty space, or any combination of these items.

Figure 8:
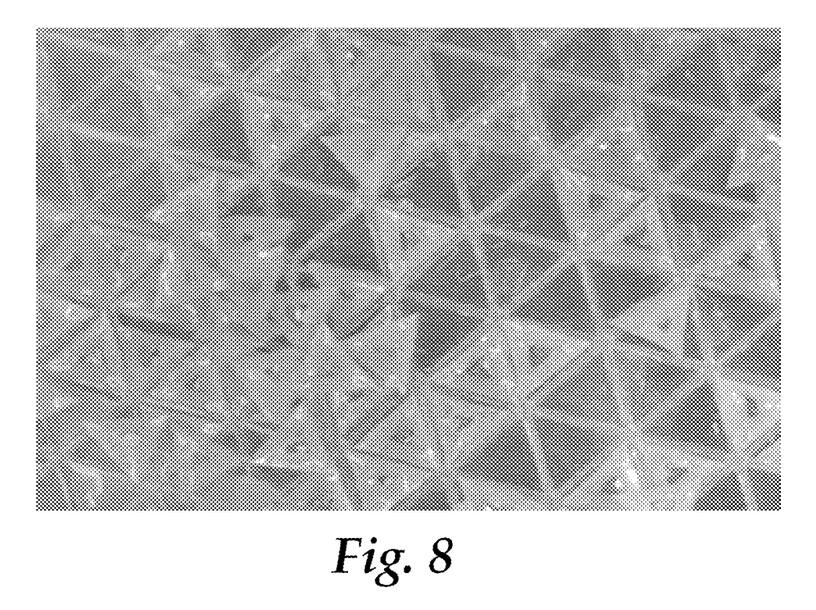
FIG. 8 illustrates a top view of a mold having a plurality of cavities containing precursor shaped abrasive particles with an opening.

FIG. 7 is a photograph comparing shaped abrasive particles 120 each with an opening 122 to dish-shaped abrasive particles 220. FIG. 8 is a photograph of a production tooling having a plurality of cavities. The precursor shaped abrasive particles in are processed in the mold to induce an opening 122 to form in each of the precursor shaped abrasive particles as they dry. Copending patent application entitled "Shaped Abrasive Particles With An Opening", filed on Dec. 17, 2008 and having U.S. Ser. No. 12/337,112 provides further information on the benefits and method of making this type of shaped abrasive particle.

Dish-Shaped Abrasive Particles

Figure 9:
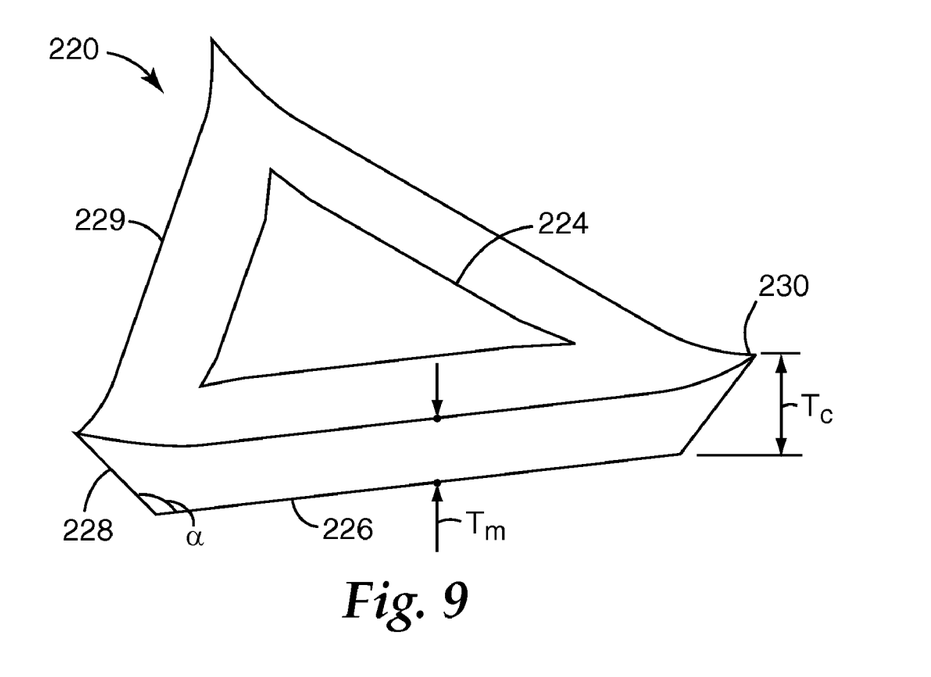
FIG. 9 illustrates a perspective view of a dish-shaped abrasive particle.
Figure 10:
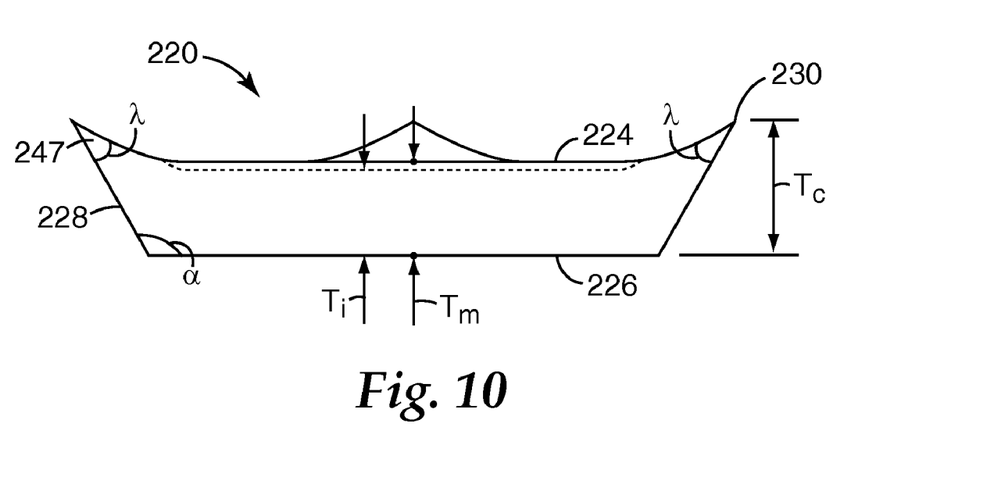
FIG. 10 illustrates a side view of the dish-shaped abrasive particle of FIG. 9.
Figure 11:
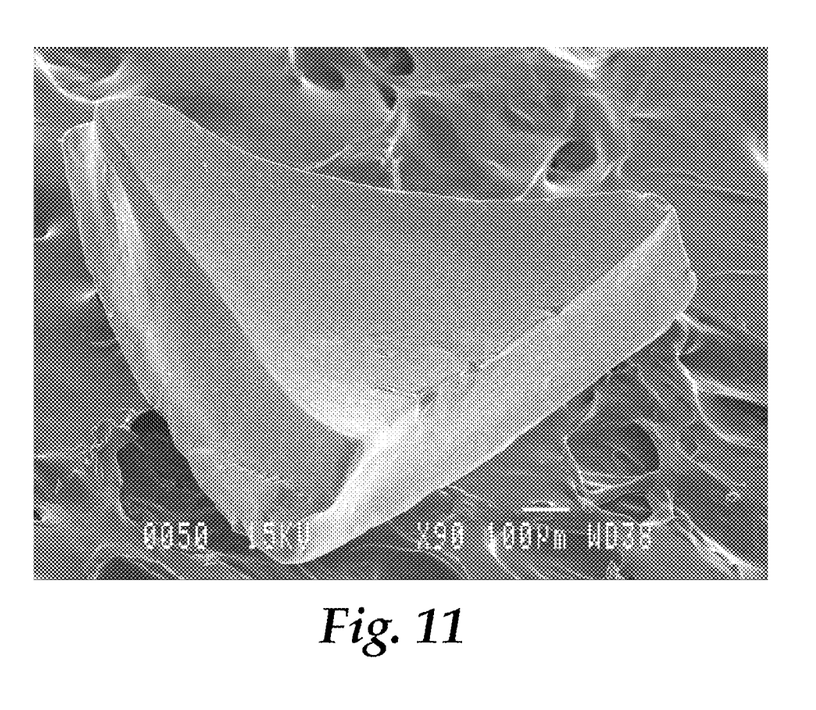
FIG. 11 illustrates a photograph showing the concave or dished surface of a dish-shaped abrasive particle.

Referring to FIGS. 9, 10, and 11 an exemplary dish-shaped abrasive particle 220 is illustrated. The material from which the dish-shaped abrasive particle 220, the abrasive shards, or the shaped abrasive particles with an opening are made comprises alpha alumina. Alpha alumina particles can be made from a dispersion of aluminum oxide monohydrate that is gelled, molded to shape, dried to retain the shape, calcined, and then sintered as discussed herein later. The shaped abrasive particle's shape is retained without the need for a binder to form an agglomerate comprising abrasive particles in a binder that are then formed into a shaped structure.

In general, the dish-shaped abrasive particles 220 comprise thin bodies having a first face 224, and a second face 226 separated by a sidewall 228 having a varying thickness T. In general, the sidewall thickness is greater at the corners of the dish-shaped abrasive particles and thinner at the midpoints along each edge. As such, Tm is less than Tc. In some embodiments, the sidewall 228 is a sloping sidewall having a draft angle α greater than 90 degrees as discussed in more detail later herein. More than one sloping sidewall can be present and the slope or draft angle for each sloping sidewall may be the same as shown in FIGS. 9 and 10 or different for each side of the dish-shaped abrasive particle as discussed in copending patent application U.S. patent application Ser. No. 12/337,075 entitled "Shaped Abrasive Particle With a Sloping Sidewall", filed on Dec. 17, 2008.

The sidewall 228 of the dish-shaped abrasive particle 220 can vary in shape and it forms the perimeter 229 of the first face 224 and the second face 226. In one embodiment, the perimeter 229 of the first face 224 and the second face 226 is selected to be a geometric shape, and the first face 224 and the second face 226 are selected to have the same geometric shape, although, they may differ in size with one face being larger than the other face. In one embodiment, the perimeter 229 of first face 224 and the perimeter 229 of the second face 226 was a triangular shape that is illustrated. In some embodiments, an equilateral triangular shape is used and in other embodiments an isosceles triangular shape is used.

In some embodiments, the first face 224 is recessed and the second face 226 is substantially planar. By recessed it is meant that that the thickness of the interior of the first face 224, Ti, is thinner than the thickness of the shaped abrasive particle along the perimeter. In one embodiment, the recessed face has a substantially flat center portion and upturned corners as shown. In other embodiments, the recessed face is substantially concave. As will be discussed in more detail, it is believed that the recessed face is formed by the sol-gel in the mold 34 forming a meniscus leaving the first face recessed as best seen in the left hand side of FIG. 7.

As mentioned, the first face 224 is recessed such that the thickness, Tc, at the points or corners 230 tends to be greater than the thickness, Ti, in the interior of the first face 224. As such, when the dish-shaped abrasive particle 220 is sitting as positioned in FIG. 10, the points or corners 230 are elevated higher than the interior of the first face 224. Without wishing to be bound by theory, it is believed that the recessed first face 224 improves the amount of material removed by the dish-shaped abrasive particle 220. In particular, an ice cream scoop or a spoon has a concave shaped end that effectively digs into materials and removes a significant quantity of the material. A scoop is much more effective than a knife or a flat thin body when digging into and removing large quantities of material. Similarly, a hollow ground chisel having a concave surface produces a sharper edge. In a similar manner, placing a recessed surface onto the dish-shaped abrasive particle 220 is believed to result in the increased grinding performance of the dish-shaped abrasive particle over similarly shaped abrasive particles having a planar first face 224 and a planar second face 226.

Additionally, it is believed that having a thinner interior portion of the shaped abrasive particle may help grinding performance of the dish-shaped abrasive particle once the sharp upturned point or corner is worn away. When the interior portion is thinner, two factors may come into play that improves grinding performance. First, a corresponding wear flat generated during use of the dish-shaped abrasive particle will have less area as compared to a shaped abrasive particle having a thicker interior section. If one particle is half as thick as the next particle, then the resulting wear flat will be half the size due to the change in the thickness. Secondly, the thinner interior portion may result in increased fracturing of the dish-shaped abrasive particles during use thereby enhancing the particle's ability to re-sharpen itself through fracture mechanics. A thicker particle is less likely to fracture than a thinner particle.

In various embodiments of the invention, a thickness ratio of Tc/Ti can be between 1.25 to 5.00, or between 1.30 to 4.00, or between 1.30 to 3.00. To calculate the thickness ratio, fifteen randomly selected dish-shaped particles are screened. The height of each corner of each particle is measured and then all of the heights are averaged to determine an average Tc. For example, a triangle would have three Tc measurements per shaped abrasive particle and 45 measurements total for use in determining the average for Tc. If the shaped abrasive particle is round, oval or otherwise does not have corners or points, then three points equidistant from each other along the perimeter should be measured for each shaped abrasive particle. Next, the smallest thickness, Ti, for the interior of the first face 224 of each particle is measured. Often the translucency of the shaped abrasive particle can be used to find the minimum interior thickness and the 15 results are averaged to determine an average Ti. The thickness ratio is determined by dividing the average Tc by the average Ti. A light microscope equipped with an X-Y stage and a vertical location measurement stage can be used to measure the thickness of various portions of the dish-shaped abrasive particles. Triangular dish-shaped abrasive particles produced by the invention have been measured to have thickness ratios between 1.55 to 2.32 in some embodiments. Triangular shaped abrasive particles produced by the prior art method disclosed in U.S. Pat. No. 5,366,523 entitled Abrasive Article Containing Shaped Abrasive Particles to Rowenhorst et al. have been measured to have thickness ratios between 0.94 to 1.15 meaning they are essentially flat and are just as likely to be slightly thicker in the middle as they are to be slightly thinner in the middle. Dish-shaped abrasive particles having a thickness ratio greater than 1.20 are statistically different from the Rowenhorst particles at the 95% confidence interval.

Referring to FIG. 9, a draft angle α between the second face 226 and the sidewall 228 of the dish-shaped abrasive particle 220 can be varied to change the relative sizes of each face. Without wishing to be bound by theory, it is believed that a draft angle other than 90 degrees results in the dish-shaped abrasive particles 220 leaning instead of having a 90 degree orientation to the backing in a coated abrasive article since the base of the dish-shaped abrasive particle 220 in the coated abrasive (sidewall 228) is sloped due to the draft angle. Because the dish-shaped abrasive particles 220 are mostly tipped or leaning to one side due to the angled base they rest on, they can have a rake angle less than 90 degrees relative to the workpiece thereby enhancing cut rates as described in greater detail in copending patent application U.S. Ser. No. 12/337,075 entitled "Shaped Abrasive Particles With A Sloping Sidewall", filed on Dec. 17, 2008. As discussed in this patent application, a slight increase in the draft angle from 90 degrees to 98 degrees has been found to double the cutting performance of triangular shaped abrasive particles.

In various embodiments of the invention, the draft angle α can be between approximately 95 degrees to approximately 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees.

The first face 224 by being recessed results in an acute angle λ between the sidewall 228 and the first face 224. This gives the dish-shaped abrasive particle a saw tooth point 247 that really digs in and removes material; especially, when the draft angle α is greater than 90 degrees such that the abrasive particles are tipped or leaning when formed into a coated abrasive article.

To further optimize the leaning orientation, the dish-shaped abrasive particles are applied in the backing in an open coat abrasive layer. A closed coat abrasive layer is defined as the maximum weight of abrasive particles or a blend of abrasive particles that can be applied to a make coat of an abrasive article in a single pass through the maker. An open coat abrasive layer is an amount of abrasive particles or a blend of abrasive particles, weighing less than the maximum weight in grams that can be applied, that is applied to a make coat of a coated abrasive article. An open coat abrasive layer will result in less than 100% coverage of the make coat with abrasive particles thereby leaving open areas and a visible resin layer between the particles. In various embodiments of the invention, the percent open area in the abrasive layer can be between about 10% to about 90% or between about 30% to about 80%.

It is believed that if too many of the dish-shaped abrasive particles with a sloping sidewall are applied to the backing, insufficient spaces between the particles will be present to allow for them to lean or tip prior to curing the make and size coats. In various embodiments of the invention, greater than 50, 60, 70, 80, or 90 percent of the dish-shaped abrasive particles in the coated abrasive article having an open coat abrasive layer are tipped or leaning having an orientation angle β less than 90 degrees.

In another embodiment of the dish-shaped abrasive particles, the first face 224 can be convex and the second face 226 can be concave. These dish-shaped abrasive particles typically have a substantially constant thickness and resemble a triangular section extracted from a spherical shell. Referring now to FIG. 11 a photomicrograph of dish-shaped abrasive particle 220 having a concave second face 226 and a convex first face 224 is shown. The sides of each triangle measured approximately 1.2 mm at the perimeter of the first face 224. The particles had a thickness of approximately 0.35 mm. Further embodiments of dish-shaped abrasive particles are described in more detail in U.S. patent application Ser. No. 12/336,961 filed on Dec. 17, 2008 entitled "Dish-Shaped Abrasive Particles With A Recessed Surface."

Method of Making Different Types of Shaped Abrasive Particles

The first process step involves providing either a seeded on un-seeded abrasive dispersion that can be converted into alpha alumina. The alpha alumina precursor composition often comprises a liquid that is a volatile component. In one embodiment, the volatile component is water. The abrasive dispersion should comprise a sufficient amount of liquid for the viscosity of the abrasive dispersion to be sufficiently low to enable filling the mold cavities and replicating the mold surfaces, but not so much liquid as to cause subsequent removal of the liquid from the mold cavity to be prohibitively expensive. In one embodiment, the abrasive dispersion comprises from 2 percent to 90 percent by weight of the particles that can be converted into alpha alumina, such as particles of alpha aluminum oxide monohydrate (boehmite), and at least 10 percent by weight, or from 50 percent to 70 percent, or 50 percent to 60 percent, by weight of the volatile component such as water. Conversely, the abrasive dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trademarks "DISPERAL", and "DISPAL", both available from Sasol North America, Inc. or "HiQ-40" available from BASF Corporation. These aluminum oxide monohydrates are relatively pure, i.e., they include relatively little, if any, hydrate phases other than monohydrates, and have a high surface area. The physical properties of the resulting shaped abrasive particles and resulting size of the particles will generally depend upon the type of material used in the abrasive dispersion.

In one embodiment, the abrasive dispersion is in a gel state. As used herein, a "gel" is a three dimensional network of solids dispersed in a liquid. The abrasive dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the abrasive dispersion can be varied based on skill in the art. Typically, the introduction of a modifying additive or precursor of a modifying additive will cause the abrasive dispersion to gel. The abrasive dispersion can also be induced to gel by application of heat over a period of time.

The abrasive dispersion can also contain a nucleating agent to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such abrasive dispersions is disclosed in U.S. Pat. No. 4,744,802 to Schwabel.

A peptizing agent can be added to the abrasive dispersion to produce a more stable hydrosol or colloidal abrasive dispersion. Suitable peptizing agents are monoprotic acids or acid compounds such as acetic acid, hydrochloric acid, formic acid, and nitric acid. Multiprotic acids can also be used but they can rapidly gel the abrasive dispersion, making it difficult to handle or to introduce additional components thereto. Some commercial sources of boehmite contain an acid titer (such as absorbed formic or nitric acid) that will assist in forming a stable abrasive dispersion.

The abrasive dispersion can be formed by any suitable means, such as, for example, simply by mixing aluminum oxide monohydrate with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as wetting agents, alcohols, or coupling agents can be added if desired. The alpha alumina abrasive grain may contain silica and iron oxide as disclosed in U.S. Pat. No. 5,645,619 to Erickson et al. on Jul. 8, 1997. The alpha alumina abrasive grain may contain zirconia as disclosed in U.S. Pat. No. 5,551,963 to Larmie on Sep. 3, 1996. Alternatively, the alpha alumina abrasive grain can have a microstructure or additives as disclosed in U.S. Pat. No. 6,277,161 to Castro on Aug. 21, 2001.

The second process step involves providing a mold 34 having at least one cavity 32, and preferably a plurality of cavities. Referring to FIGS. 1, 4, and 8, the mold 34 has a generally planar bottom surface 30 and a plurality of cavities 32. The plurality of cavities can be formed in a production tool. The production tool can be a belt, a sheet, a continuous web, a coating roll such as a rotogravure roll, a sleeve mounted on a coating roll, or die. The production tool comprises polymeric material. Examples of suitable polymeric materials include thermoplastics such as polyesters, polycarbonates, poly(ether sulfone), poly(methyl methacrylate), polyurethanes, polyvinylchloride, polyolefins, polystyrene, polypropylene, polyethylene or combinations thereof, and thermosetting materials. In one embodiment, the entire tooling is made from a polymeric or thermoplastic material. In another embodiment, the surfaces of the production tooling in contact with the sol-gel while drying, such as the surfaces of the plurality of cavities, comprises polymeric or thermoplastic materials and other portions of the production tooling can be made from other materials. A suitable polymeric coating may be applied to a metal tooling to change its surface tension properties by way of example.

A polymeric tool can be replicated off a metal master tool. The master tool will have the inverse pattern desired for the production tool. The master tool can be made in the same manner as the production tool. In one embodiment, the master tool is made out of metal, e.g., nickel and is diamond turned. A polymeric sheet material can be heated along with the master tool such that the polymeric material is embossed with the master tool pattern by pressing the two together. The polymeric or thermoplastic material can also be extruded or cast onto the master tool and then pressed. A thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities 32 can be from an opening in the top surface 38 or from an opening (not shown) in the bottom surface 30. In some instances, the cavity 32 can extend for the entire thickness of mold 34. Alternatively, the cavity 32 can extend only for a portion of the thickness of the mold 34. In one embodiment, the top surface 38 is substantially parallel to bottom surface 30 of the mold 34 with the cavities having a substantially uniform depth. At least one side of the mold 34, i.e. the side in which the cavity is formed, can remain exposed to the surrounding atmosphere during the step in which the volatile component is removed.

The cavity 32 has a specified three-dimensional shape. In one embodiment, the shape of a cavity can be described as being a triangle, as viewed from the top, having a sloping sidewall 36 such that the bottom surface 30 of the cavity is slightly smaller than the opening in the top surface 38. A sloping sidewall is believed to enable easier removal of the precursor abrasive particles from the mold. In various embodiments of the disclosure, the predetermined angle α can be between about 95 degrees to about 130 degrees, or between about 95 degrees to about 120 degrees such as 98 degrees. In another embodiment, the mold 34 comprised a plurality of triangular cavities. Each of the plurality of triangular cavities comprises an equilateral triangle.

Alternatively, other cavity shapes can be used, such as, circles, rectangles, squares, hexagons, stars, or combinations thereof, all having a substantially uniform depth dimension. The depth dimension is equal to the perpendicular distance from the top surface 38 to the lowermost point on the bottom surface 30. In addition, a cavity can have the inverse of other geometric shapes, such as, for example, pyramidal, frusto-pyramidal, truncated spherical, truncated spheroidal, conical, and frusto-conical. The depth of a given cavity can be uniform or can vary along its length and/or width. The cavities of a given mold can be of the same shape or of different shapes.

The third process step involves filling the cavities in the mold with the abrasive dispersion by any conventional technique. In one embodiment, the top surface 38 of the mold 34 is coated with the abrasive dispersion. The abrasive dispersion can be pumped onto top surface 38. Next, a scraper or leveler bar can be used to force the abrasive dispersion fully into the cavity 32 of the mold 34. The remaining portion of the abrasive dispersion that does not enter cavity 32 can be removed from top surface 38 of the mold 34 and recycled. In some embodiments, a knife roll coater or vacuum slot die can be used. In some embodiments, a small portion of the abrasive dispersion can remain on top surface 38 and in other embodiments the top surface is substantially free of the dispersion. The pressure applied by the scraper or leveler bar is typically less than 100 psi, or less than 50 psi, or less than 10 psi. In some embodiments, no exposed surface of the abrasive dispersion extends substantially beyond the top surface 38 to ensure uniformity in thickness of the resulting abrasive particles.

In one embodiment, the internal surfaces of the cavity including the sidewall 36 and the bottom surface 30 are free of mold release agents. Typical mold release agents include, for example, oils such as peanut oil, fish oil, or mineral oil, silicones, polytetrafluoroethylene, zinc sterate, and graphite. Absence of a mold release agent helps to ensure that the precursor shaped abrasive particles will stick to the cavity walls as the abrasive dispersion is dried thereby cracking at least the majority of the precursor shaped abrasive particles in the mold. In other embodiments, a mold release is used to form intact shaped abrasive particles. In general, between about 0.1% to about 5% by weight mold release agent, such as peanut oil, in a liquid, such as water or alcohol, is applied to the surfaces of the production tooling in contact with the sol-gel such that between about 0.1 mg/in$^2$ to about 3.0 mg/in$^2$, or between about 0.1 mg/in$^2$ to about 5.0 mg/in$^2$ of the mold release agent is present per unit area of the mold when a mold release is desired.

The fourth process step involves controlling the rheology of the sol-gel in the mold to make different types of shaped abrasive particles. In particular, the inventors have determined that the viscosity of the sol-gel, the presence or absence of mold release agent, and the drying rate interact to distinctly shape the final abrasive particle when using a thermoplastic or polymeric mold. By controlling these variables, the kinetics and thermodynamics of the system are balanced thereby affecting the type of the shaped abrasive particle produced. Thus, the exact same mold cavity can produce abrasive shards, shaped abrasive particles having an opening, dish-shaped abrasive particles, or shaped abrasive particles having two parallel planar faces.

In general, eliminating the mold release agent and using a polymeric or thermoplastic mold can result in the formation of abrasive shards as the sol-gel sticks more to the mold and fractures. In general, using a mold release and a higher yield stress sol-gel that is more rapidly dried tends to from a meniscus in the sol-gel mold forming a dish-shaped abrasive particle. In general, by increasing the drying rate when there is mold release agent on the surface of the polymeric mold will increase the size of the meniscus in contact with air in a dish-shaped abrasive particle. The forming of an even larger meniscus eventually produces an opening in the shaped abrasive particle. The sol-gel yield stress (maximum viscosity as a function of shear rate) can be measured using a rheometer such as a Bohlin Gemini 200 available from Malvern instruments Ltd, having an office in Worcestershire, United Kingdom.

Table 1 below lists some of the process parameters that have been found to produce the different types of the shaped abrasive particles. However, since the resulting type of shaped abrasive particle depends on the complex rheology of the sol-gel in the mold while drying, there is some overlap in the process conditions and the variables may need adjustment depending on the exact sol-gel used and the surface tension properties of the mold.

TABLE 1

Typical Process Parameters To Control Abrasive Particle Type

| Variable | Dish-Shaped Abrasive Particle | Abrasive Shards | Shaped Abrasive Particle With Opening | Shaped Abrasive Particle With Parallel Faces |
|---|---|---|---|---|
| Mold Release | None to 5.0 mg/in$^2$ e.g. 1.0 mg/in$^2$ | None to <0.05 mg/in$^2$ e.g. 0 mg/in$^2$ | 0.5 mg/in$^2$ to 5.0 mg/in$^2$ e.g. 0.25 mg/in$^2$ | 0 mg/in$^2$ to 5.0 mg/in$^2$ e.g. 0.5 mg/in$^2$ |
| Sol-Gel Yield stress | $\eta$ > 6000 Pa·s e.g. >12000 Pa·s | $\eta$ > 1000 Pa·s e.g. >6000 Pa·s | $\eta$ > 4000 Pa·s e.g. >8000 Pa·s | $\eta$ > 4000 Pa·s e.g. $\eta$ > 8000 Pa·s |
| Drying Time To Enable Unmolding | 2 to 7.5 minutes Typically, dry slower at lower temperatures e.g. 2.5 minutes | 1.5 to 7.5 minutes e.g. 2.0 minutes | 1.5 to 7.5 minutes Typically, dry faster at higher temperatures e.g. 2.0 minutes | 10 minutes to 24 hours e.g. 1 hour |

Abrasive Shards

To make abrasive shards, the sol-gel is fractured while drying in the mold. Desirably, the volatile component of the sol-gel is removed by rapid evaporation. A sufficient amount of the volatile component must be rapidly removed from the abrasive dispersion to bring rapid solidification thereof, thereby forming a plurality of precursor shaped abrasive particles that are fractured into at least two pieces. The fractured, precursor shaped abrasive particles have approximately the same shape as the shape of the mold cavity, but are fractured into two or more pieces. Typically, up to 40 percent of the liquid is removed from the abrasive dispersion in this step.

In some embodiments, removal of the volatile component by evaporation occurs at temperatures above the boiling point of the volatile component. An upper limit to the drying temperature often depends on the material the mold is made from. For polypropylene tooling the tooling temperature should be less than the melting point of the plastic. The drying temperature to fracture at least a majority of the precursor shaped abrasive particles into at least two or more pieces is also dependent on the solids content of the abrasive dispersion and the volatile component in the dispersion.

In one embodiment, for a water dispersion of between about 40 to 50 percent solids and a polypropylene mold, the drying temperatures can be from about 90 degrees C. to about 165 degrees C., or between about 105 degrees C. to about 150 degrees C., or between about 105 degrees C. to about 120 degrees C. Higher temperatures can fracture the precursor shaped abrasive particles faster but can also lead to degradation of the polypropylene tooling limiting its useful life as a mold.

Alternatively or in combination with the rapid evaporation, mechanical apparatus can be used to fracture the precursor shaped abrasive particles into at least two pieces while residing in the cavities in the mold. For example, a pair of nipped rolls can be used to apply a normal force to the mold to deflect and crack the precursor shaped abrasive particles. The nipped rolls could include a knurled or embossed roll that is loaded against the top surface 38 and an elastomeric roll that can be loaded against the bottom surface of the mold as the mold traverses the through the nip. It is also possible to flex or sharply bend the mold to crack and fracture the precursor shaped abrasive particles while residing in the mold.

Referring specifically to FIG. 1, a mold comprising a plurality of cavities 32 is shown. Contained within the cavities of the mold is a plurality of precursor shaped abrasive particles 23. The mold is formed from polypropylene material. Each of the cavities comprises an equilateral triangle with each leg of the triangle having a length of approximately 0.110 inch (2.8 mm) (when measured at the top surface 38 (FIG. 4). Each cavity 32 was designed such that the sidewall 36 intersected with the bottom surface 30 at a predetermined angle α of approximately 98 degree. Each cavity 32 had an approximate depth of 0.28 inch (7.1 mm) when measured perpendicularly from the bottom surface 30 to the top surface 38.

Each cavity 32 in the left-hand side of the mold was coated with a thin layer of 0.1% peanut oil in methyl alcohol, which acted as a release agent. Each cavity in the right-hand side of the mold was left untreated and was free of any release agents. The polypropylene production tooling treated with 0.1% peanut oil in methyl alcohol had a surface energy of approximately 35 dynes/cm, which resulted in few fractured, precursor shaped abrasive particles. The untreated tooling without using any mold release agent had a wetting tension of approximately 32 dynes/cm, which resulted in fracturing almost all of the precursor shaped abrasive particles. Desirably, the wetting tension of the contacting surface of the production tool is less than about 33 dynes/cm. Wetting tension can be measured using wetting tension test solutions made by Enercon Industries Corporation. The test solutions are applied using cotton swabs to spread the solutions onto the production tooling in accordance with ASTI D2578-04a "Standard Test Method for Wetting Tension of Polyethylene and Polypropylene Films."

After filling each cavity with an abrasive dispersion, the mold was placed into an oven and heated at a temperature of approximately 110 degrees C. for a period of 45 minutes. Approximately 99.7% of the precursor abrasive particles by weight in the right-hand side of the mold in FIG. 1 were fractured into approximately 2 to 4 pieces thereby producing a plurality of fractured, precursor shaped abrasive particles within each mold cavity. The fractured, precursor shaped abrasive particles in the mold were run across an ultrasonic horn to remove them from the mold. The resulting abrasive shards after firing were screened to a −35+40 sieve fraction and then photographed as shown in FIG. 3. In contrast, the left-hand side of the mold in FIG. 1 when treated with the peanut oil release agent and dried under identical conditions had approximately 18% by weight of the fractured abrasive particles.

Shaped Abrasive Particles with an Opening

To produce an opening 122 in the particles while in the mold, the volatile component is removed by fast evaporation rates. A sufficient amount of the volatile component must be rapidly removed from the abrasive dispersion to bring rapid solidification thereof, thereby forming a large meniscus that leads to formation of an opening 122.

In some embodiments, removal of the volatile component by evaporation occurs at temperatures above the boiling point of the volatile component. An upper limit to the drying temperature often depends on the material the mold is made from. For polypropylene tooling, the temperature should be less than the melting point of the plastic.

In one embodiment, for a water dispersion of between about 40 to 50 percent solids and a polypropylene mold, the drying temperatures can be from about 90 degrees C. to about 165 degrees C., or between about 105 degrees C. to about 150 degrees C., or between about 105 degrees C. to about 120 degrees C. Higher temperatures led to the formation of larger openings but can also lead to degradation of the polypropylene tooling limiting its useful life as a mold.

In one embodiment, a sol was prepared by combining 600 parts deionized water, 24 parts nitric acid 400, 400 parts boehmite alumina (DISPERAL, Sasol North America Inc., Houston Tex.), 45.6 parts silica sol (Nycol 215 from Eka Nobel, Inc. of Augusta, Ga.), and 76.2 parts of a 9% solution of iron oxide (as $Fe_2O_3$) in water, followed by mixing in a high-speed mixer for two minutes. The mixture was allowed to stand for one hour to form a sol-gel.

The sol-gel was coated into a polymeric tool with openings in the shape of equilateral triangles approximately 90 mils (2.286 mm) on each side and 30 mils (0.762 mm) thick, by forcing the sol-gel into the openings with a putty knife. The coated tool was attached to a tenter frame and placed into an oven (LABDRYER LTE, Warner Mathis USA, Inc., Concord, N.C.) set at 145 degrees Celsius and the fan set at 2000 RPM to blow air on the surface of the coating, until the surface temperature of the coating reached 21 degrees Celsius. The resulting shaped, dried particles uniformly had central openings 122 in them as shown in FIG. 8. These precursor abrasive particles can be fired to produce shaped abrasive particles 120 with an opening 122.

Dish-Shaped Abrasive Particles

In one embodiment, a sample of boehmite sol-gel was made using the following recipe: aluminum oxide monohydrate powder (4824 parts) having the trade designation "DISPERAL" was dispersed by high shear mixing a solution containing water (7087 parts) and 70% aqueous nitric acid (212 parts) for 13 minutes. The resulting sol-gel was aged for 1 hour before coating. The sol-gel was forced into production tooling having triangular shaped mold cavities of 28 mils depth and 110 mils on each side. The draft angle α between the sidewall and bottom of the mold was 98 degrees. The sol-gel was forced into the cavities with a vacuum slot die coating station so that all the openings of the production tooling were completely filled. A mold release agent, 2% peanut oil in water was used on the production tooling to apply about 1 $mg/in^2$. The sol-gel coated production tooling was passed through a 27 foot convection air oven at 10 feet per minute set to 135 degrees Celsius at 60% air velocity in the 13.5 foot zone 1 section and 121 degrees Celsius at 40% air velocity in the 13.5 foot zone 2 section. The dish-shaped precursor abrasive particles were removed from the production tooling by passing it over an ultrasonic horn. The dish-shaped precursor abrasive particles were calcined at approximately 650 degrees Celsius and then saturated with a mixed nitrate solution of the following concentration (reported as oxides): 1.8% each of MgO, $Y_2O_3$, $Nd_2O_3$ and $La_2O_3$. The excess nitrate solution was removed and the saturated dish-shaped precursor abrasive particles were allowed to dry after which the particles were again calcined at 650 degrees Celsius and sintered at approximately 1400 degrees Celsius thereby completing the formation of dish-shaped abrasive particles. Both the calcining and sintering was performed using rotary tube kilns.

The fifth process step involves removing the plurality of precursor shaped abrasive particles from the mold cavities. The plurality of precursor shaped abrasive particles can be removed from the cavities by using the following processes alone or in combination on the mold: gravity, vibration, ultrasonic vibration, vacuum, or pressurized air to remove the particles from the mold. If making fractured, precursor shaped abrasive particles, the particles once removed from the cavities could be reassembled like jig saw puzzle pieces to have approximately the same shape as the cavities of the mold from which they were formed.

The precursor shaped abrasive particles can be further dried outside of the mold. If the abrasive dispersion is dried to the desired level in the mold, this additional drying step is not necessary. However, in some instances it may be economical to employ this additional drying step to minimize the time that the abrasive dispersion resides in the mold. Typically, the precursor shaped abrasive particles will be dried for 10 to 480 minutes, or from 120 to 400 minutes, at a temperature from 50 degrees C. to 160 degrees C., or at 120 degrees C. to 150 degrees C.

The sixth process step involves calcining the plurality of precursor shaped abrasive particles. During calcining, essentially all the volatile material is removed, and the various components that were present in the abrasive dispersion are transformed into metal oxides. The precursor shaped abrasive particles are generally heated to a temperature of from 400 degrees C. to 800 degrees C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor shaped abrasive particles. Then the plurality of precursor shaped abrasive particles are prefired again. This option is further described in European Patent Application No. 293,163.

The seventh process step involves sintering the calcined, plurality of precursor shaped abrasive particles to form the shaped abrasive particles such as abrasive shards 21, shaped abrasive particles 120 with openings 122, or dish-shaped abrasive particles 220. Prior to sintering, the calcined, precursor shaped abrasive particles are not completely densified and thus lack the desired hardness to be used as abrasive particles. Sintering takes place by heating the calcined, precursor shaped abrasive particles to a temperature of from 1,000 degrees C. to 1,650 degrees C. and maintaining them within this temperature range until substantially all of the alpha alumina monohydrate (or equivalent) is converted to alpha alumina and the porosity is reduced to less than 15 percent by volume. The length of time to which the calcined, precursor shaped abrasive particles must be exposed to the sintering temperature to achieve this level of conversion depends upon various factors but usually from five seconds to 48 hours is typical. In another embodiment, the duration for the sintering step ranges from one minute to 90 minutes. After sintering, the abrasive particles can have a Vickers hardness of 10 GPa, 16 GPa, 18 GPa, 20 GPa, or greater Other steps can be used to modify the described process, such as rapidly heating the material from the calcining temperature to the sintering temperature, centrifuging the abrasive dispersion to remove sludge, waste, etc. Moreover, the process can be modified by combining two or more of the process steps if desired. Conventional process steps that can be used to modify the process of this disclosure are more fully described in U.S. Pat. No. 4,314,827 to Leitheiser. Additionally, any of the shaped abrasive particles can have grooves on one of the faces as described in copending application U.S. Ser. No. 12/627,567 entitled "Shaped Abrasive Particles With Grooves", filed on Dec. 17, 2008. The grooves are formed by a plurality of ridges in the bottom surface of the mold cavity that have been found to make it easier to remove the precursor shaped abrasive particles from the mold.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

Example 1

Preparation of Abrasive Shards

A boehmite gel was made by the following procedure: aluminum oxide monohydrate powder (1,235 parts) having the trade designation "DISPERAL" was dispersed by continuous mixing in a solution containing water (3,026 parts) and 70% aqueous nitric acid (71 parts). The sol that resulted was then heated to a temperature of approximately 125° C. in a continuous dryer to produce a 44% solids dispersion. The sol-gel was forced into production tooling having triangular shaped mold cavities of 28 mils depth and 110 mils on each side. The draft angle α between the sidewall and bottom of the mold was 98 degrees. During construction of the production tooling, 50% of the mold cavities were manufactured to have 8 parallel ridges rising from the bottom surfaces of the cavities that intersected with one side of the triangle at a 90 degree angle. The parallel ridges were spaced every 0.277 mm and the cross section of the ridges was a triangle shape having a height of 0.0127 mm and a 45 degree angle between the sides of each ridge at the tip as described in patent application Ser. No. 12/627,567 referred to above. The sol-gel was forced into the cavities with a putty knife until all openings of the tooling were completely filled. No mold release was used on the production tooling and the sol-gel coated production tooling was placed in a convection air oven set at 110 degrees C. and dried for 40 minutes to fracture the precursor shaped abrasive particles while residing in the cavities of the production tooling. The fractured, precursor shaped abrasive particles were removed from the production tooling by passing it over an ultrasonic horn. The fractured precursor shaped abrasive particles were calcined at approximately 650 degrees C. and then saturated with a mixed nitrate solution of the following concentration (reported as oxides): 1.8% each of MgO, $Y_2O_3$, $Nd_2O_3$ and $La_2O_3$. The excess nitrate solution was removed and the saturated fractured precursor shaped abrasive particles were allowed to dry after which the particles were again calcined at 650 degrees C. and sintered at approximately 1400 degrees C. Both the calcining and sintering was performed using rotary tube kiln. Typical alpha alumina abrasive shards produced by the above method are shown in FIG. 3.

Samples of dish-shaped alpha alumina triangular particles were prepared in a similar fashion as described above except, in this case, a release agent consisting of 0.1% peanut oil in methyl alcohol was sprayed onto the production tooling prior to filling. Typical alpha alumina abrasive triangles produced by the method are shown in FIG. 2. By looking closely, it is possible to see the result of the sol-gel meniscus (areas where a light reflection line occurs along the edge) such that the perimeter of the dish-shaped abrasive particles is thicker than the recessed or depressed center portion of the first face.

As discussed more fully in copending provisional U.S. patent application Ser. No. 61/016,965 entitled Shaped, Fractured Abrasive Particle, Abrasive Article Using Same, and Method of Making filed on Dec. 27, 2007, the abrasive shards out performed random crushed alpha alumina abrasive grain and prior art abrasive triangles produced by the method disclosed in U.S. Pat. No. 5,366,523 to Rowenhorst.

Example 2

Preparation of REO-Doped Dish-Shaped Abrasive Particles

A sample of boehmite sol-gel was made using the following recipe: aluminum oxide monohydrate powder (4824 parts) having the trade designation "DISPERAL" was dispersed by high shear mixing a solution containing water (7087 parts) and 70% aqueous nitric acid (212 parts) for 13 minutes. The resulting sol-gel was aged for 1 hour before coating. The sol-gel was forced into production tooling having triangular shaped mold cavities of 28 mils depth and 110 mils on each side. The draft angle α between the sidewall and bottom of the mold was 98 degrees. During construction of the production tooling, 50% of the mold cavities were manufactured to have 8 parallel ridges rising from the bottom surfaces of the cavities that intersected with one side of the triangle at a 90 degree angle. The parallel ridges were spaced every 0.277 mm and the cross section of the ridges was a triangle shape having a height of 0.0127 mm and a 45 degree angle between the sides of each ridge at the tip as described in patent application Ser. No. 12/627,567 referred to above. The sol-gel was forced into the cavities with a vacuum slot die coating station so that all the openings of the production tooling were completely filled. A mold release agent, 2% peanut oil in water was coated on the production tooling to apply about 1 mg/in$^2$ of peanut oil. The sol-gel coated production tooling was passed through a 27 foot convection air oven at 10 feet per minute set to 135 degrees Celsius at 60% air velocity in the 13.5 foot zone 1 section and 121 degrees Celsius at 40% air velocity in the 13.5 foot zone 2 section. The precursor shaped abrasive particles were removed from the production tooling by passing it over an ultrasonic horn. The precursor shaped abrasive particles were calcined at approximately 650 degrees Celsius and then saturated with a mixed nitrate solution of the following concentration (reported as oxides): 1.8% each of MgO, $Y_2O_3$, $Nd_2O_3$ and $La_2O_3$. The excess nitrate solution was removed and the saturated precursor shaped abrasive particles were allowed to dry after which the particles were again calcined at 650 degrees Celsius and sintered at approximately 1400 degrees Celsius. Both the calcining and sintering was performed using rotary tube kilns Example 3

Preparation of REO-Doped Shaped Abrasive Particles with Openings

The above procedure for the dish-shaped abrasive particles was followed except that the production tooling was not retreated with peanut oil mold release on the second use. The reduction of peanut oil present in the mold cavities was believed to be the condition for making an opening 122 within each individual triangular particle. The resulting triangular-shaped abrasives each had an opening 122 near the center. FIG. 7 shows the shaped abrasive particles from the two preparation procedures. The dish-shaped abrasive particles tend to be thicker at the points and along the perimeter and have a recessed or concave center portion. Furthermore, not all of the dish-shaped particles in FIG. 7 are shown with the recessed face visible. One of the dish-shaped particles in the upper left hand corner is shown with the planar second face 226 visible.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method comprising:
   providing a mold having a plurality of cavities, the plurality of cavities comprising polymeric surfaces;
   filling the plurality of cavities with a sol-gel, the sol-gel comprising particles that can be converted into alpha alumina in a liquid, the liquid comprising a volatile component; and
   removing at least a portion of the volatile component from the sol-gel while the sol-gel resides in the plurality of cavities and controlling the rheology of the sol-gel in the mold by selecting a viscosity of the sol-gel, a presence or absence of a mold release agent, and a drying rate to thereby form a plurality of precursor shaped abrasive particles having a type selected from the group consisting of a majority of abrasive shards, shaped abrasive particles with an opening, and dish-shaped abrasive particles.

2. The method of claim 1 comprising fracturing at least a majority of the plurality of precursor shaped abrasive particles into at least two pieces while the plurality of precursor shaped abrasive particles reside within the plurality of cavities thereby forming a plurality of fractured precursor shaped abrasive particles.

3. The method of claim 2 comprising removing the plurality of fractured precursor shaped abrasive particles from the plurality of cavities, calcining the plurality of fractured precursor shaped abrasive particles thereby forming a plurality of calcined fractured precursor shaped abrasive particles, and sintering the plurality of calcined fractured precursor shaped abrasive particles thereby forming a plurality of alpha alumina abrasive shards.

4. The method of claim 2 wherein the fracturing comprises drying at a temperature above the boiling point of the volatile component.

5. The method of claim 2 wherein the volatile component comprises water and a drying temperature is between about 105 degrees C. to about 150 degrees C.

6. The method of claim 2 wherein the fracturing comprises fracturing 75 percent to 100 percent of the plurality of precursor shaped abrasive particles into at least two pieces.

7. The method of claim 2 wherein the plurality of cavities comprise polypropylene surfaces and the mold release agent is not applied to the plurality of cavities in the mold.

8. The method of claim 7 wherein the fracturing comprises drying at a temperature between about 105 degrees C. to about 120 degrees C.

9. The method of claim 8 wherein the plurality of cavities comprises an equilateral triangle.

10. The method of claim 7 wherein the sol-gel comprises a percent solids between about 30 to about 50 percent.

11. The method of claim 2 wherein the plurality of cavities comprises an equilateral triangle.

12. The method of claim 1 comprising treating the plurality of cavities with the mold release agent prior to filling the plurality of cavities with the sol-gel and forming a plurality of dish-shaped precursor abrasive particles or a plurality of precursor shaped abrasive particles with an opening.

13. The method of claim 12 wherein the mold release agent comprises peanut oil.

14. The method of claim 12 wherein the sol-gel comprises a yield stress of greater than about 6000 Pa·s thereby forming the plurality of dish-shaped precursor abrasive particles.

15. The method of claim 14 comprising removing the plurality of dish-shaped precursor abrasive particles from the plurality of cavities, calcining the plurality of dish-shaped precursor abrasive particles thereby forming a plurality of calcined, dish-shaped precursor abrasive particles, and sintering the plurality of calcined, of dish-shaped precursor abrasive particles thereby forming a plurality of dish-shaped abrasive particles.

16. The method of claim 14 wherein the plurality of cavities comprises an equilateral triangular shape.

17. The method of claim 12 wherein the sol-gel comprises a yield stress of greater than about 4000 Pa·s thereby forming the plurality of precursor shaped abrasive particles with an opening.

18. The method of claim 17 comprising removing the plurality of precursor shaped abrasive particles with an opening from the plurality of cavities, calcining the plurality of precursor shaped abrasive particles with an opening thereby forming a plurality of calcined precursor shaped abrasive particles with an opening, and sintering the plurality of calcined precursor shaped abrasive particles with an opening thereby forming a plurality of shaped abrasive particles with an opening.

19. The method of claim 17 wherein the plurality of cavities comprises an equilateral triangular shape.

20. The method of claim 7 wherein the fracturing comprises fracturing 90 percent to 100 percent of the plurality of precursor shaped abrasive particles into at least two pieces.

21. The method of claim 2 wherein the mold release agent on the polymeric surface comprises an amount none to less than 0.05 mg/in$^2$.

22. The method of claim 21 wherein a yield stress of the sol-gel is greater than 6000 Pa·s.

23. The method of claim 2 wherein the polymeric surfaces comprise a wetting tension less than about 33 dynes/cm.

24. The method of claim 14 wherein the mold release agent on the polymeric surfaces comprises an amount of 1.0 mg/in$^2$.

25. The method of claim 24 wherein the yield stress of the sol gel is greater than 12000 Pa·s.

26. The method of claim 14 wherein the yield stress of the sol gel is greater than 12000 Pa·s.

27. The method of claim 14 wherein the polymeric surfaces comprise a wetting tension of not less than about 33 dynes/cm.

28. The method of claim 17 wherein the mold release agent on the polymeric surfaces comprises an amount of 0.25 mg/in$^2$.

29. The method of claim 28 wherein the yield stress of the sol gel is greater than 8000 Pa·s.

30. The method of claim 17 wherein the yield stress of the sol gel is greater than 8000 Pa·s.

31. The method of claim 17 wherein the polymeric surfaces comprise a wetting tension of not less than about 33 dynes/cm.

32. The method of claim 12 wherein the polymeric surfaces comprise a wetting tension of greater than approximately 32 dynes/cm.

33. The method of claim 12 wherein the polymeric surfaces comprise a wetting tension of approximately 35 dynes/cm.

* * * * *

UNITED STATES PATENT AND TRADEMARK OFFICE
CERTIFICATE OF CORRECTION

| | |
|---|---|
| PATENT NO. | : 8,123,828 B2 |
| APPLICATION NO. | : 12/337001 |
| DATED | : February 28, 2012 |
| INVENTOR(S) | : Scott R Culler et al. |

It is certified that error appears in the above-identified patent and that said Letters Patent is hereby corrected as shown below:

Column 5
Line 21, delete "grade," and insert -- grade. --, therefor.

Column 13
Line 24, delete "sterate," and insert -- stearate, --, therefor.

Column 18
Line 2, delete "greater" and insert -- greater. --, therefor.

Signed and Sealed this
Twenty-ninth Day of May, 2012

David J. Kappos
*Director of the United States Patent and Trademark Office*